(12) United States Patent
Klein (10) Patent No.: US 11,003,574 B2
(45) Date of Patent: May 11, 2021

(54) OPTIMIZED TESTING SYSTEM (71) Applicant: SAP SE, Walldorf (DE)

(72) Inventor: Udo Klein, Eggenstein-Leopoldshafen (DE)

(73) Assignee: SAP SE, Walldorf (DE)

( * ) Notice: Subject to any disclaimer, the term of this patent is extended or adjusted under 35 U.S.C. 154(b) by 86 days.

(21) Appl. No.: 16/001,687

(22) Filed: Jun. 6, 2018

(65) Prior Publication Data
US 2019/0377666 A1 Dec. 12, 2019

(51) Int. Cl.
G06F 11/36 (2006.01)
(52) U.S. Cl.
CPC ...... *G06F 11/3684* (2013.01); *G06F 11/3688* (2013.01); *G06F 11/3692* (2013.01)
(58) Field of Classification Search
CPC ............. G06F 11/3688; G06F 11/3664; G06F 11/3692; G06F 11/3676; G06F 11/3616; G06F 11/3684; G06F 11/263
See application file for complete search history.

(56) References Cited

U.S. PATENT DOCUMENTS

| | | | |
|---|---|---|---|
| 7,480,900 B1 * | 1/2009 | Zhou | G06F 11/3676 714/38.1 |
| 7,840,944 B2 | 11/2010 | Brunswig et al. | |
| 9,164,752 B2 | 10/2015 | Kaiser et al. | |
| 9,514,034 B1 | 12/2016 | Griffin et al. | |
| 9,514,037 B1 | 12/2016 | Dow et al. | |
| 10,678,678 B1 * | 6/2020 | Tsoukalas | G06F 11/3664 |
| 2004/0154001 A1 | 8/2004 | Haghighat et al. | |
| 2007/0266371 A1 * | 11/2007 | Ramakrishnan | G06F 11/3664 717/121 |
| 2010/0146490 A1 * | 6/2010 | Grosse | G06F 11/3688 717/131 |
| 2013/0019126 A1 | 1/2013 | Frohlich et al. | |
| 2013/0111267 A1 * | 5/2013 | Beryoza | G06F 11/3688 714/32 |
| 2014/0013164 A1 * | 1/2014 | Ma | G06F 11/3688 714/38.1 |
| 2015/0317244 A1 * | 11/2015 | Shann | G06F 11/3664 717/128 |

OTHER PUBLICATIONS

Stephen W. Thomas et al.; Static test case prioritization using topic models; Springer; pp. 182-212; retrieved on Dec. 23, 2020. (Year: 2012).*

Benedikt Eberhardinger et al.; Test Suite Reduction for Self-organizing Systems a Mutation-based Approach; ACM; pp. 64-70; retrieved on Dec. 23, 2020. (Year: 2018).*

* cited by examiner

*Primary Examiner* — S. Sough
*Assistant Examiner* — Cuong V Luu
(74) *Attorney, Agent, or Firm* — Mintz Levin Cohn Ferris Glovsky and Popeo, P.C.

(57) ABSTRACT

Described herein includes a software testing system that optimizes test case scheduling to efficiently and speedily analyze a block of code. The system enhances the performance of software testing by implementing a test controller using test statistics to optimize testing performance. The test controller may use the test statistics to determine relevant test cases to execute, and to provide better and/or faster feedback to users.

17 Claims, 6 Drawing Sheets

OPTIMIZED TESTING SYSTEM

TECHNICAL FIELD

The subject matter described herein relates generally to software maintenance and testing and, more specifically, to the optimization of software test scheduling using test statistics.

BACKGROUND

Software maintenance may include modifying a software program to correct defects and/or improve performance. In some instances, software maintenance and/or testing may occur after the software program has been deployed into a production environment. A test suite may be implemented to test the software program to determine whether there are any errors or to ensure that modifications to the software program do not adversely affect any existing functionalities of the software program.

SUMMARY

Systems, methods, and articles of manufacture, including computer program products, are provided for processing a query for ranking certain data sets and/or subsets. In one aspect, there a method that includes collecting, during testing of code, at least one test statistic. The at least one test statistic may include an association between a test case from a plurality of test cases and a portion of the code. The method further includes generating a reduced test suite to test a block of code that includes the portion of the code. The reduced test suite may be generated by at least selecting, from the plurality of test cases and based on the at least one test statistic, at least the test case. The method also includes testing the block of code, using the reduced test suite. The reduced test suite may include at least the test case.

In some variations, one or more of the features disclosed herein including the following features can optionally be included in any feasible combination. For example, the at least one test statistic may be collected and stored by a test controller. The method further includes determining, by the test controller, that the block of code is to be tested upon receipt of a triggering event. The triggering event may include an instruction to test the portion of the code, a scheduled test case, and/or a commit of code.

In other examples, the association between the test case from the plurality of test cases and the portion of the code includes a detection of an error by the test case in the portion of the code. The method may further include determining, based on the testing, that the block of code includes an error in the portion of the code. A ticket may be generated associated with the error. The ticket may include a location of the error in the block of code and user information related to a user from which a client device received the block of code. The ticket may then be transmitted.

In some examples, the at least one test statistic further includes an execution time of each test case of the plurality of test cases, a timestamp indicating a time each test case of the plurality of test cases was run, an identification of a commit of code to a code repository, an error detected by each test case of the plurality of test cases, and/or a location of the error detected by each test case of the plurality of test cases.

In other examples, the method may further include determining that a change has occurred in the block of code. The method may include retesting the block of code. Retesting the block of code may further include detecting that a regression in the block of code has occurred due at least in part by the change in the block of code. The regression may indicate that at least a portion of the block of code includes an error. The at least the portion may have been previously error-free. The retesting may further include bisecting, based on the at least one test statistic, the retested block of code to determine a location of the error. The retesting further includes determining that the error is located within the portion of the code of the block of code. The retesting also includes executing, based on the at least one test statistic, the test case to determine the location of the error.

In some examples, the method further includes generating a ticket associated with the error in the portion of the code of the retested block of code. The ticket includes a location of the error in the retested block of code and user information related to a user from which a client device received the change in the block of code.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Automated tools and/or test suites may be implemented during software development to improve the quality of implemented code, such as a software program. For example, as code is developed, users, such as software developers, may store the code in development repositories, such as software or code repositories. In some instances, certain tools may execute test suites, when changes to the code are submitted to the development repositories. Test suites may require an unnecessarily large amount of time and/or computing resources to complete testing of a software program, leading to delayed feedback, inefficient use of computing resources, and increased expense. Certain implementations of the current subject matter may optimize software testing by reducing the size of test suites based on collected data and/or streamlining the detection of errors in the software using the collected data.

In some instances, a state of code after a commit of code (e.g., a submission or change of at least a portion of the code) may be intermediate and/or inconsistent. When a consistent state of the code is reached, a user may flag the state via a client device. Flagging may occur implicitly or explicitly, such as in systems based on SAP's ABAP (Advanced Business Application Programming) (e.g., flagging may occur by releasing code for transport to a development repository) and GIT (e.g., flagging of a consistent state is performed by merging or rebasing code into a main or master branch).

Certain tools may be implemented to assess the quality of the flagged code. The tools may help provide feedback to users, such as developers, and may help to identify errors, bugs, and/or regressions, and/or the like. The tools may allow for easier identification and removal of errors in the code. The tools may include build tests that determine whether code may be built; unit, integration, and performance tests that are created ad hoc for the particular code base; generic code tests linters that check for syntactical and idiosyncratic issues; generic code complexity metrics including as branch count, nesting depth, cohesion, and/or the like; code scanners and data flow analyzers that test for well-known security issues; coverage analyzers that check how much of the code is actually covered by tests; license scanners that use libraries and dependencies that are compatible with a product's licensing model, and/or the like. As mentioned above, tools may require an unnecessarily large amount of time and/or computing resources. Certain implementations of the systems described herein may reduce the amount of time and/or computing resources required to test the software by executing tool selection (based on collected and stored data).

Test suites, among other tools, have become more expansive as advancements in software have continued to grow. Larger test suites, including a greater number and variety of test cases may lead to longer testing runtimes up to several hours, days, or more depending on the size of the project. Thus, test suites may require a very large amount of time to perform each test case and/or may consume a great amount of computing resources. For example, a test suite may be implemented to test the software program to determine whether there are any errors or to ensure that modifications to the software program do not adversely affect any existing functionalities of the software program. The test suite may include test cases covering every functionality of the software program. Performing testing by running the full test suite and/or a large portion of the test suite even if the portion of the test suite does not cover the relevant portion of the software program being tested may consume an unnecessarily large amount of time and computing resources, and may lead to delayed feedback to developers, which may negatively impact program development.

Test cases may be parallelized to reduce the overall testing runtime. However, parallelization of test case execution may not reduce CPU cycle consumption and/or the cost of executing the test cases. Indeed, parallelization of test case execution may increase CPU cycle consumption and/or the cost of testing the software program. Although changes received by the client device committed by users via a display screen of the client device may not increase in time consumption, the overall cost of the test cases may rise significantly. The systems according to implementations of the current subject matter may reduce the overall number of test cases executed based on data collected during previous testing, and may select the test cases to be executed based on at least runtime and/or relevance to the portion of the software program being tested.

The test case runtime may increase linearly relative to the size of the code base. For example, the overall runtime may be summarized as $\theta(n)$, where n is the number of lines of code. Thus, as the code base grows, test results may take longer to compute. As a result, feedback provided by test cases to users may be undesirably delayed.

In some instances, since systems may receive commits of small portions of code, the total number of commits may be equal to $\theta(n)$. For example, in a system, a full test suite may be required to be launched for every commit of code. As a result, the overall test runtime over the project life cycle may be at least $\theta(n^2)$. As mentioned above, as the project grows, the runtime and/or consumed CPU cycles per line of code (and the computing costs) are of an order of $\theta(n)$. As the projects become large enough, the test suites may significantly increase the costs associated with executing test cases to analyze code or a software program. Software testing systems according to implementations of the current subject matter may reduce the runtime of test suites to provide users via the client device with faster feedback and/or with greater specificity as to the location of bugs in the commits of code and other related details, and/or reduce overall CPU consumption and costs. Software testing systems according to implementations of the current subject matter may desirably notify users of errors more quickly to enhance software development efficiency.

Figure 1A:
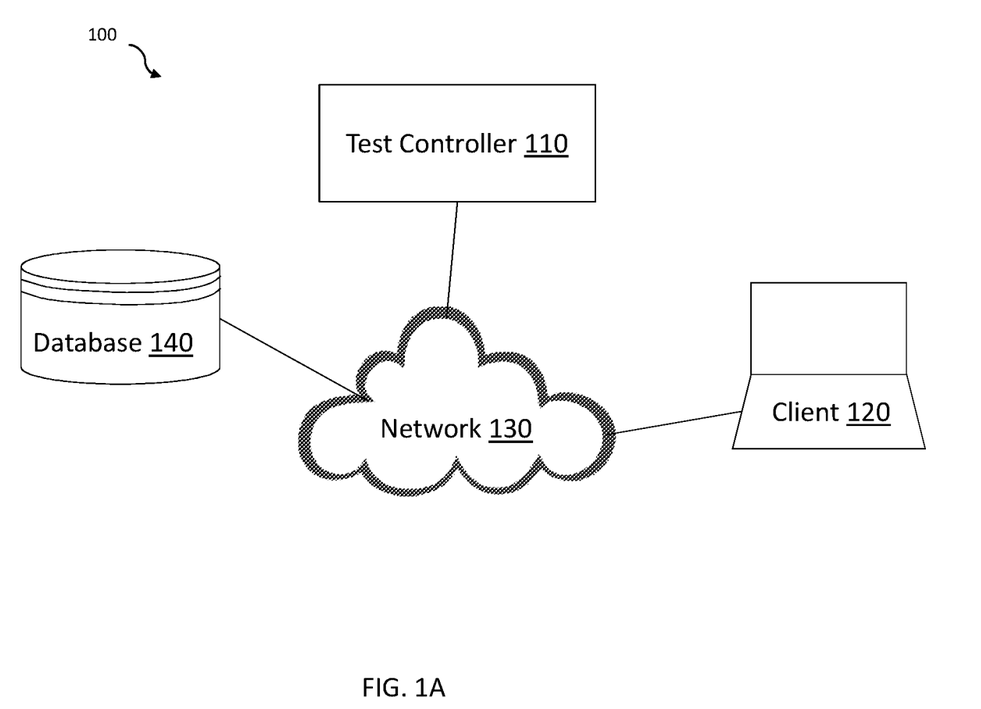
FIG. 1A depicts a system diagram illustrating a software testing system consistent with some implementations of the current subject matter.

FIG. 1A depicts a network block diagram illustrating a software testing system 100 consistent with some implementations of the current subject matter. The software testing system 100 may include a test controller 110, one or more clients 120, a database 140, and a wired and/or wireless network 130.

The test controller 110 may interact with various features of the software testing system 100, such as the one or more clients 120 and the database 140 to test code and generate feedback based on the testing of the code. During the testing of the code, the test controller 110 may collect data (e.g., at least one test statistic) relating, at least in part, to one or more test cases used to test the code and various portions of the code being tested. The data may be stored in the database 140, which may include a database management system (DBMS) that is coupled with an in-memory database, a relational database, and/or any other types of persistence. The test controller 110 may use the collected and/or stored data to generate a reduced test suite to test a block of code (see, for example, FIG. 1B), and to test the block of code with the reduced test suite. Testing the block of code using the reduced test suite can help to provide faster and better feedback via the one or more clients 120.

The one or more clients 120 may be any device that includes at least one processor and at least one memory including program code. For example, the client 120 may be a computer, a tablet, a mobile device, a smart phone, and/or a wearable device. The client 120 may be any data collection device configured with network connectivity. In some implementations, the client 120 may receive code or other software from a user via a display screen. For example, the user may perform code maintenance and/or testing via the client 120. The client 120 may receive one or more instructions and/or commands from the user for modifying the code. The client 120 may further receive, one or more instructions and/or commands, submitted via the display screen, to test the code to identify faults or errors that may have been introduced by the modifications. According to some implementations, the software testing system 100 may be configured to respond to commands and/or instructions received via the client 120 to test a software program by running at least a subset of test cases in a corresponding test suite for the code.

Referring to FIG. 1A, the test controller 110 may be communicatively coupled with the one or more clients 120, and/or the database 140 via the wired and/or wireless network 130. The wired and/or wireless network 130 may be a public land mobile network (PLMN), a local area network (LAN), a virtual local area network (VLAN), a wide area network (WAN), a point-to-point link, the Internet, and/or the like.

Figure 1B:
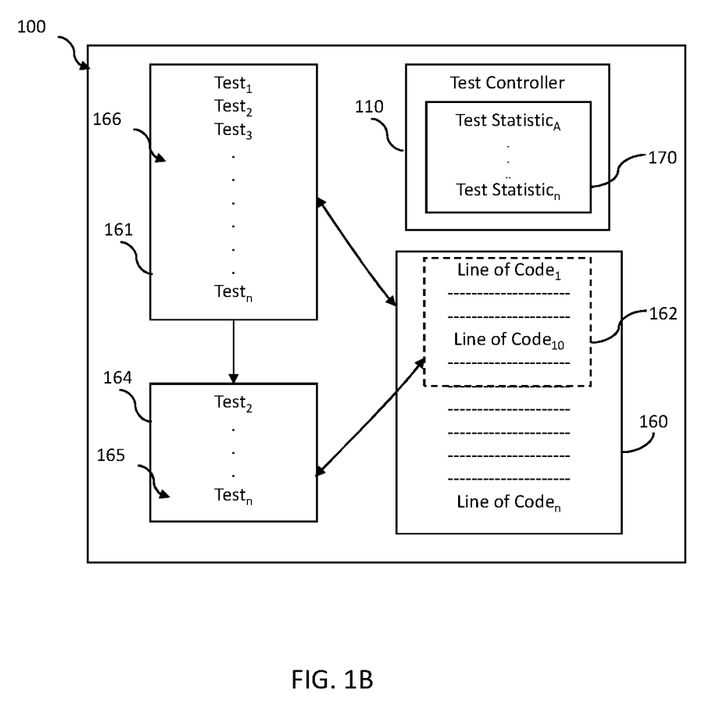
FIG. 1B depicts a block diagram illustrating a software testing system consistent with some implementations of the current subject matter.

FIG. 1B depicts a block diagram illustrating an example of the software testing system 100 including the test controller 110 consistent with some implementations of the current subject matter. As mentioned above, the test controller 110 may use collected and/or stored test statistics to generate a reduced test suite to test a block of code. For example, the test controller 110 may be used to test a block of code 160.

Before testing the block of code 160, the test controller 110 may test another block of code (which includes the block of code 160) using a full test suite 161 including a plurality of test cases 166 to collect at least one test statistic 170. The at least one test statistic 170 may relate, at least in part, to the plurality of test cases 166 and one or more portions of code of the block of code being tested with each test case of the plurality of test cases 166.

The test controller 110 may determine that the block of code 160 includes a portion of code 162 (e.g., one or more lines of code) that has the same or similar properties to one or more of portions of code of the previously tested block of code. To test the block of code 160, the test controller 110 may generate a reduced test suite 164, based on at least one test statistic 170. For example, the test controller 110 may select, from the plurality of test cases 166, at least a test case 165 of the plurality of test cases 166. The at least one test statistic 170 may include an association between the selected test case 165 included in the reduced test suite 164 and the portion of code 162 of the block of code 160. Using the reduced test suite 164 that includes the selected test case 165, the test controller 110 can test the block of code 160.

Figure 2:
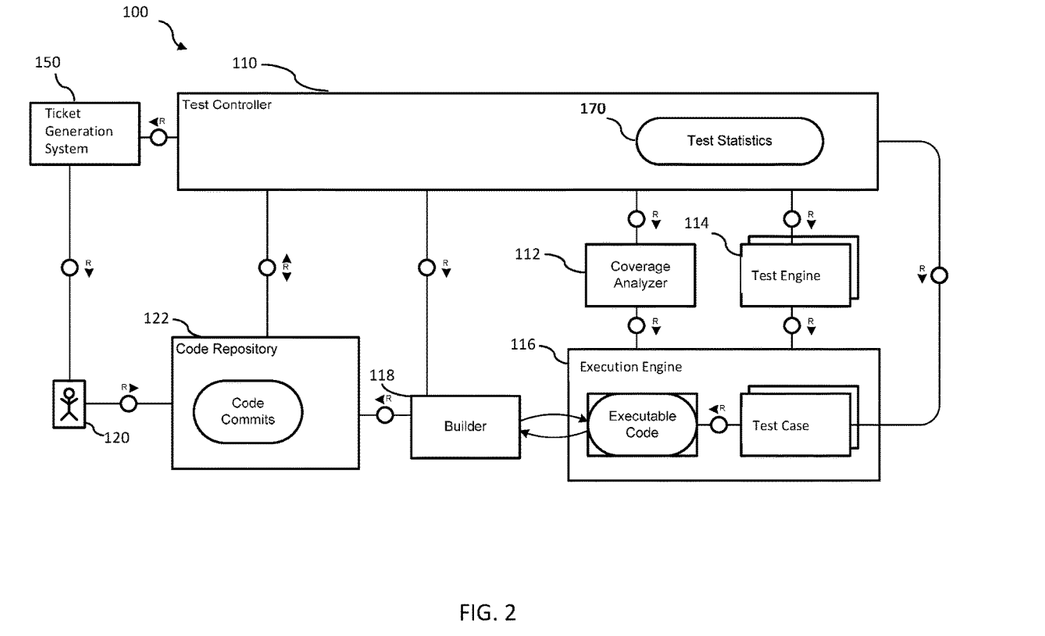
FIG. 2 depicts a detailed system diagram illustrating a software testing system consistent with some implementations of the current subject matter.

FIG. 2 depicts a more detailed system diagram illustrating the software testing system 100 consistent with some implementations of the current subject matter. Referring to FIG. 2, the software testing system 100 may include the test controller 110. As mentioned above, the test controller 110 may be communicatively coupled, via a wired and/or wireless network 130, with the client 120 and/or the database 140. The test controller 110 may also be communicatively coupled, via a wired and/or wireless network 130, with a ticket generation system 150, a code repository 122, a builder 118, an execution engine 116, a coverage analyzer 112, a test engine 114, and/or the like.

The client 120 may receive commits of code submitted by the user via the display screen. The code repository 122 may receive the commits of code and may store code that has been merged and/or rewritten into a main or master branch at the code repository. The builder 118 may build a software program and/or block of code or other executable code based on at least a portion of the code stored in the code repository 122. The execution engine 116 may execute the software program, block of code, or other executable code for testing using at least one test case.

The test controller 110 may determine when code has been committed to the code repository 122. In some implementations, the test controller 110 may send instructions to the builder 118 to compile executable code based on at least a portion of the code stored in the code repository 122, including the portion of the code that was most recently received by the client 120. The test controller 110 may, for example, send instructions to the execution engine 116 to execute the executable code to determine whether the code is successful and/or contains any errors.

The test controller 110 may analyze the executed code via the coverage analyzer 112 and/or the test engine 114 (that runs one or more test cases). The test controller 110 may collect and/or store one or more test statistics via the coverage analyzer 112 and/or the test engine 114, for example. The test statistics, such as the one or more test statistics 170, may include certain data, including an association between a particular portion of the code and the particular user that the client 120 received the submitted particular portion of code from; an association between a test case and the particular user that the client received a submitted test case; a time that the code is submitted; the size of the code that is submitted; when the test case is submitted; overall commit frequency per developer; current commit frequency per developer; average test case runtime; which code or portion of code is covered by a particular test case; issues detected by the at least one test case; location in the code where issues are determined by one or more test cases (including package, file, class, function, method, and/or the like); detection statistics for each test case; issues not detected by a particular test case; and/or which test case triggered the issue to be fixed by a particular commit, and/or the like. The test controller 110 may communicate with a ticket generation system 150 to generate tickets and/or otherwise notify the user via the client 120 of any errors, along with other relevant information.

Figure 3:
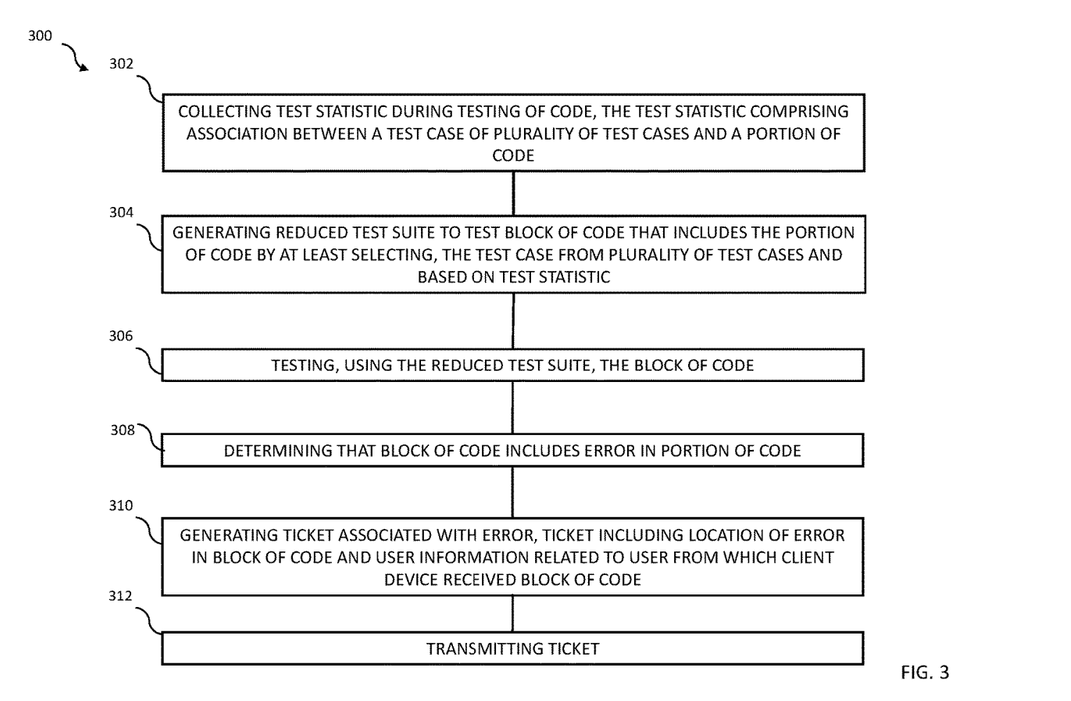
FIG. 3 depicts a flowchart illustrating a process for optimizing test scheduling consistent with some implementations of the current subject matter.

FIG. 3 shows a process flow chart 300 illustrating features of a process consistent with one or more implementations of the current subject matter.

At 302, the test controller 110 may, for example, collect one or more test statistics (such as one or more test statistics 170) during testing of code. As mentioned above, the one or more test statistics 170 may include at least an association between a test case 165 from a plurality of test cases 166 and a portion of code 162 associated with the test case 165. In some implementations, the test controller 110 may collect the plurality of test statistics 170 over the duration of a project.

For example, the test controller 110 may determine, based on the code repository 122, whether any changes were made to the uncompiled code stored in the code repository 122. The test controller 110 may perform the check on a regular basis (e.g., daily, before the first test case is executed each day, before each test case is executed, and/or the like), and/or periodically upon receipt of a triggering action. If the test controller 110 determines that any code was altered and/or any errors were fixed, the test controller 110 may determine a test case (for example, test case 165) that located the error and the block(s) of code that were fixed. The test controller 110 may mark the test case as strongly indicative for issues in the portion of code (e.g., a type of error or a particular type of code) of the block of code. The test controller 110 may store the association between the test case and the portion of code and/or the entire block of code as a test statistic.

In some implementations, the test controller 110 may determine whether any test statistics 170 have been collected and/or stored. If the test controller 110 determines that no test statistics and/or a limited amount of test statistics have been collected and/or stored, at least one or more of the plurality of test statistics may be generated by the test controller 110.

The test controller 110 may execute the full test suite 161 and/or as many full test cases are available in the test suite. For example, if test cases in the full test suite are flagged as slow and/or only necessary for release, the test controller 110 may skip the flagged test cases in situations in which an admissible test case runtime is already exhausted by the remaining test cases in the test suite. The test controller 110 according to implementations of the current subject matter may help to collect a more comprehensive distribution of test statistics, without wasting computing resources.

In some implementations, the test controller 110 may inject bugs or other errors into code (including by removing parts of the implementation or exchanging branches of the code). The test controller 110 may execute the test suite to test the manipulated code to collect one or more test statistics. In some implementations, the test controller 110 may execute the full test suite to test the manipulated code to collect one or more test statistics. The test statistics may be stored in a database that is in communication with the test controller 110. The database may be stored locally and/or remotely from the test controller 110.

If the test controller 110 determines that one or more test statistics have been collected and/or stored, the test controller 110 may select at least one test case to execute based on the test statistics. For example, the test controller 110 may determine, upon a triggering event, that at least one test case from the plurality of test cases should be executed to test at least a portion of the block of code stored in the code repository 122. The block of code may include the portion of code.

The triggering event may include an explicit triggering event, such as a scheduled test at fixed time or for certain events (e.g., a final check before release, once per day, once per week, and/or the like), and/or an implicit triggering event, such as by receipt of a commit of code to the code repository 122. In some implementations, all test cases may be executed upon receipt of an explicit triggering event. In some implementations, at least one test case may be executed upon receipt of an implicit triggering event.

As mentioned above, if the test controller 110 determines that one or more test statistics have been collected and/or stored, the test controller 110 may select at least one test case to execute based on the test statistics.

At 304, the test controller may generate a reduced test suite (such as reduced test suite 164) to test the block of code stored in the code repository by at least selecting, from the plurality of test cases based on the at least one test statistic, at least the test case. The block of code may include the portion of code. For example, as shown in FIG. 1B, the block of code 160 includes the portion of code 162.

The test controller 110 may identify, based on the test statistics collected by the test controller during testing of the software program, at least the test case from the plurality of test cases to test the portion of code of the block of code. For example, as shown in FIG. 1B, the test case 165 may be selected based on the at least one test statistic 170 that includes at least an association between the test case 165 and the portion of code 162 of the block of code 160 being tested. Thus, the test controller 110 may infer from the test statistics at least one test case from the plurality of test cases that should be scheduled.

If multiple test cases are selected, the test controller 110 may use the test statistics to determine an order of the test cases to execute. For example, the test controller 110 may schedule a selected test case to run first and/or towards the beginning of the execution of the test case(s). The test case may be selected if the test statistics indicate that the test case is a strong indicated for a particular type of bug in the committed portion of code. In some implementations, the selected test case may be selected if the runtime of the test case is known to be short, and/or the test case has a higher detection rate, among other indicators.

In some implementations, the test controller 110 may select certain test cases to be executed. For example, the test controller 110 may prioritize certain test cases by ranking and/or sorting the test cases of the test suite in order based on at least the test statistics and/or the portion of code being tested, to determine which test case of the plurality of test cases should be executed first. The test controller 110 may not require every test case known to have a short runtime to be executed to test a block of code. Rather, in some implementations, the test controller 110 may use the test statistics to select at least one test case that is known to have a short runtime and/or is known to be associated with detecting errors in the portion of code and/or entire block of code being tested. The test controller 110 according to implementations of the current subject matter may reduce runtime, reduce required CPU consumption, and/or the like.

The test controller 110 may execute the reduced test suite containing at least the identified test case to test the block of code. During execution of the test suite, the test controller 110, such as via the coverage analyzer 112, may collect one or more test statistics and/or one or more additional test statistics. For example, the test statistics may include execution time per test case, covered code per test case, errors detected per test case, location of the errors detected in the block of code, a timestamp of the test case, and/or an identification of repository commit, and/or the like. In some implementations, test cases that cover at least a portion of the block of code may be flagged as potentially indicative for the portion of code. Test cases that do not cover at least a portion of the block of code may be flagged as not indicative for the portion of code.

At 308, during execution of the reduced test suite, the test controller 110 may determine, such as via the coverage analyzer 112, that the portion of code of the block of code includes at least one error. For example, the test controller 110 may determine by executing the test case 165 of the reduced test suite 164 that the portion of code 162 includes an error.

At 310, the test controller 110 may generate a ticket, such as via the ticket generation system 150, associated with the error in the portion of code of the block of code. The ticket may include a location of the error in the block of code and/or user information related to the user from which the client 120 received the submitted block of code. The location of the error in the block of code may be at least in part determined using the test statistics. For example, the test statistics can indicate the test case to implement to determine the location of the error in the block of code, the test statistics can indicate a portion of code of the block of code that is likely to contain the error, and/or the like.

At 312 the ticket may be transmitted to the user. For example, the ticket may be transmitted to the user in an electronic message or notification, such as via the one or more clients 120. In some implementations, the test controller 110 otherwise notifies the user of the error via the client 120.

Figure 4:
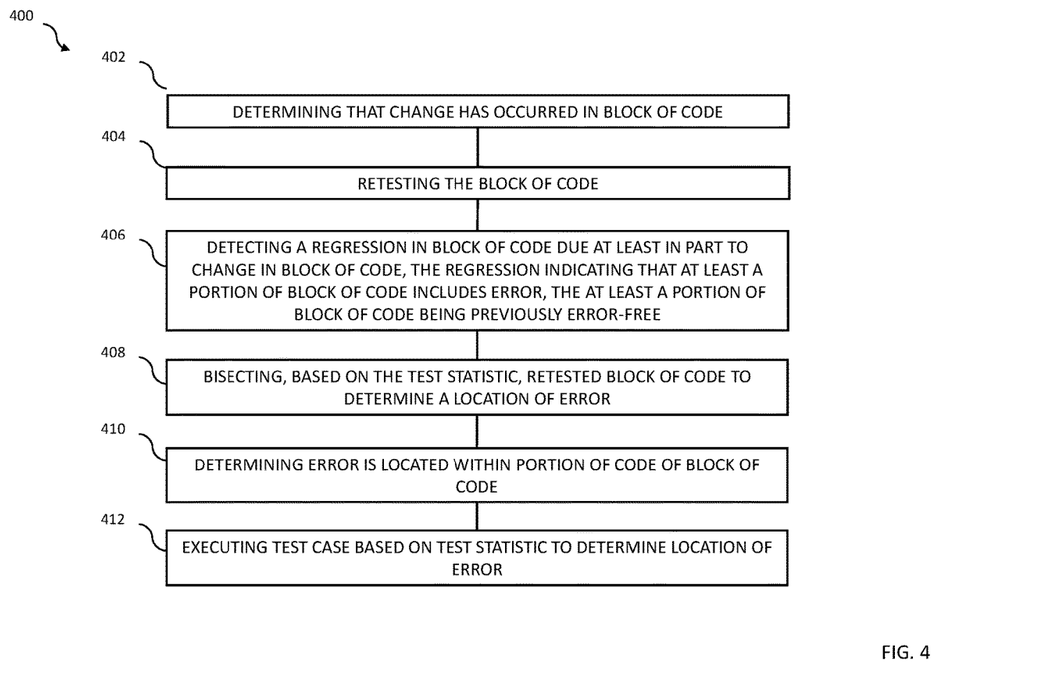
FIG. 4 depicts a flowchart illustrating a second process for determining a location of an error consistent with some implementations of the current subject matter.

FIG. 4 shows a process flow 400 consistent with one or more implementations of the current subject matter.

At 402, the test controller 110 may determine that a change has occurred in the block of code stored in the code repository 122. For example, the test controller 110 may determine that at least a portion of the code of the block of code is different than a previous version of the block of code.

At 404, the test controller 110 may execute the test suite to test and/or retest the block of code. For example, the full test suite 161 and/or the reduced test suite 164 can be executed to test the block of code 160 using one or more test cases of the plurality of test cases 166.

At 406, the test controller 110 may detect a regression in the block of code. For example, the regression may indicate that at least a portion of code of the block of code failed or includes an error when the block of code was previously error-free. The test controller 110 may determine that the regression occurred as a result of the change in the block of code.

At 408, the test controller 110 may begin to bisect the block of code, based on at least one test statistic including a test case associated with the affected portion of code of the block of code, to determine a location of the error. For example, in certain situations in which a test case detects an error in the block of code and the last successful run of the block of code was more than one repository commit behind, the test controller 110 may begin to bisect (e.g., split the block of code in half) the repository commit chain, and/or rerun the test accordingly to locate which commit introduced the error. Depending on the number of found errors, the number of commits, and/or the statistically known build times, the test controller 110 may not bisect the block of code on a test level but instead may bisect the block of code and rerun all or at least some of the test cases that detected errors. The test controller 110 according to implementations of the current subject matter may help to significantly reduce overall runtime, and/or computing usage.

At 410, the test controller 110 may determine that an error is located within the portion of code of the block of code, as a result of the bisecting of the block of code and/or using the test statistics to determine a region of the block of code to begin bisecting. For example, the test controller 110 may determine that an error is located within the portion of code 162 due at least in part to the bisecting of the block of code 160. To determine where to begin bisecting the block of code 160, the test controller 110 may use the test statistics 170 (such as a similar error that was previously located).

At 412, the test controller 110 may execute the test case based on the at least one test statistic to determine the location of the error. For example, the at least one test statistic can indicate the test case to implement to determine the location of the error in the block of code, the test statistics can indicate a portion of code of the block of code that is likely to contain the error, and/or the like.

As mentioned above, the test controller 110 may generate a ticket, such as via the ticket generation system 150, associated with the error in the portion of code of the block of code. The ticket may include a location of the error in the block of code and/or user information related to the user from which the client received the submitted block of code that triggered the error. The tickets may be useful in helping to pinpoint an error in the software program during testing. The ticket may be transmitted to the user via at least the client 120. Accordingly, implementations of the current subject matter described herein may desirably reduce CPU consumption, reduce testing runtime, increase the speed of user feedback to such as to developers during software program development, create a less expensive software program testing system, and/or the like.

Figure 5:
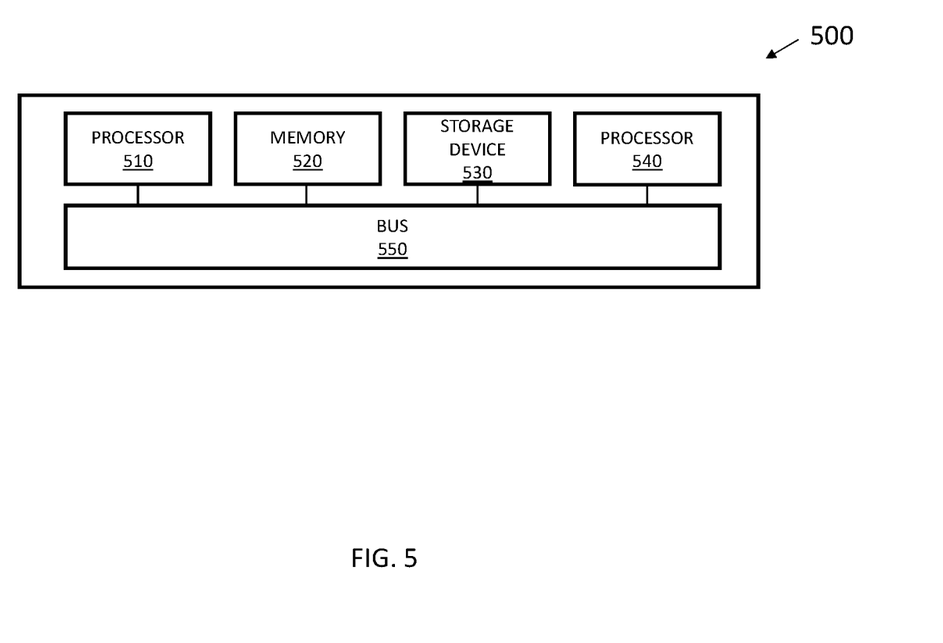
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 may be used to implement the distributed data storage system 100 and/or any components therein.

As shown in FIG. 5, the computing system 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution within the computing system 500. The executed instructions may implement one or more components of, for example, distributed data storage system 100. In some implementations of the current subject matter, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 may store data structures representing configuration object databases, for example. The storage device 530 is capable of providing persistent storage for the computing system 500. The storage device 530 may be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet).

In some implementations of the current subject matter, the computing system 500 may be used to execute various interactive computer software applications that may be used for organization, analysis and/or storage of data in various formats. Alternatively, the computing system 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities (e.g., SAP Integrated Business Planning as an add-in for a spreadsheet and/or other type of program) or may be standalone computing products and/or functionalities. Upon activation within the applications, the functionalities may be used to generate the user interface provided via the input/output device 540. The user interface may be generated and presented to a user by the computing system 500 (e.g., on a computer screen monitor, etc.).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store the machine instructions non-transitorily, such as for example as would a non-transient solid-state memory or a magnetic hard drive or any equivalent storage medium. The machine-readable medium may alternatively or additionally store the machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, the phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one data processor; and
   at least one memory storing instructions which, when executed by the at least one data processor, cause operations comprising:
   determining, by a test controller, during testing of a first block of code, at least one test statistic has not been collected;
   collecting, by the test controller, based on the determination and during the testing of the first block of code, the at least one test statistic, the at least one test statistic comprising an association between a test case from a plurality of test cases and a portion of the first block of code, the association comprising a previous detection, by the test case, of a type of error in the portion of the first block of code, the collecting comprising:
   injecting, by the test controller, one or more errors into the first block of code;
   testing, by the test controller using a full test suite including each of the plurality of test cases, the first block of code;
   detecting, by the test controller, the type of error in the portion of the first block of code, the type of error associated with the injected one or more errors; and
   associating, by the test controller, the type of error with the portion of the first block of code;
   storing, by the test controller in a database, the at least one test statistic;
   generating, by the test controller and based on detection of a commit of a second block of code, a reduced test suite to test the second block of code that includes the portion of the first block of code by at least:

accessing, by the test controller directly from the database, the at least one test statistic;

selecting, by the test controller and based on the accessed at least one test statistic, the test case from the plurality of test cases; and adding, by the test controller, the test case to the reduced test suite when the association of the accessed at least one test statistic indicates that the test case previously detected the type of error in the portion of the first block of code; and testing, by the test controller using the reduced test suite including the test case, the second block of code.

2. The system of claim 1, wherein the operations further comprise:

generating, by the test controller, the at least one test statistic; and storing the at least one generated test statistic.

3. The system of claim 2, wherein the generating further comprises: determining, by the test controller, that the second block of code is to be tested upon receipt of a triggering event, the triggering event including an instruction to test a portion of the second block of code, a scheduled test case, and/or the commit of the second block of code.

4. The system of claim 1, wherein the operations further comprise:

determining, based on the testing the second block of code, that the second block of code includes a detected error in a portion of the second block of code;

generating a ticket associated with the detected error, the ticket including a location of the detected error in the second block of code and user information related to a user from which a client device received the second block of code; and transmitting the ticket.

5. The system of claim 1, wherein the at least one test statistic further includes an execution time of the test case of the plurality of test cases, a timestamp indicating a time the test case of the plurality of test cases was run, an identification of a commit of code to a code repository, a detected error detected by the test case of the plurality of test cases, and/or a location of the detected error detected by the test case of the plurality of test cases.

6. The system of claim 1, wherein the operations further comprise:

determining that a change has occurred in the second block of code; and retesting the second block of code, the retesting comprising:

detecting that a regression in the second block of code has occurred due at least in part by the change in the second block of code, the regression indicating that at least a portion of the second block of code includes a detected error, the at least the portion of the second block of code being previously error-free, bisecting, based on the at least one test statistic, the retested second block of code to determine a location of the detected error, determining that the detected error is located within the at least the portion of the second block of code, and executing, based on the at least one test statistic, the test case to determine the location of the detected error.

7. The system of claim 6, wherein the operations further comprise: generating a ticket associated with the detected error in the at least portion of the second block of code, the ticket including the location of the detected error in the retested second block of code and user information related to a user from which a client device received the change in the second block of code.

8. A computer-implemented method, comprising:

determining, by a test controller, during testing of a first block of code, at least one test statistic has not been collected;

collecting, by the test controller, based on the determination and during the testing of the first block of code, the at least one test statistic, the at least one test statistic comprising an association between a test case from a plurality of test cases and a portion of the first block of code, the association comprising a previous detection, by the test case, of a type of error in the portion of the first block of code, the collecting comprising:

injecting, by the test controller, one or more errors into the first block of code;

testing, by the test controller using a full test suite including each of the plurality of test cases, the first block of code;

detecting, by the test controller, the type of error in the portion of the first block of code, the type of error associated with the injected one or more errors; and associating, by the test controller, the type of error with the portion of the first block of code;

storing, by the test controller in a database, the at least one test statistic;

generating, by the test controller and based on detection of a commit of a second block of code, a reduced test suite to test the second block of code that includes the portion of the first block of code by at least:

accessing, by the test controller directly from the database, the at least one test statistic;

selecting, by the test controller and based on the accessed at least one test statistic, the test case from the plurality of test cases; and adding, by the test controller, the test case to the reduced test suite when the association of the accessed at least one test statistic indicates that the test case previously detected the type of error in the portion of the first block of code; and testing, by the test controller using the reduced test suite including the test case, the second block of code.

9. The method of claim 8, further comprising:

generating, by the test controller, the at least one test statistic; and storing the at least one generated test statistic.

10. The method of claim 9, wherein the generating further comprises: determining, by the test controller, that the second block of code is to be tested upon receipt of a triggering event, the triggering event including an instruction to test a portion of the second block of code, a scheduled test case, and/or the commit of the second block of code.

11. The method of claim 8, further comprising:

determining, based on the testing the second block of code, that the second block of code includes a detected error in a portion of the second block of code;

generating a ticket associated with the detected error, the ticket including a location of the detected error in the second block of code and user information related to a user from which a client device received the second block of code; and transmitting the ticket.

12. The method of claim 8, wherein the at least one test statistic further includes an execution time of the test case of the plurality of test cases, a timestamp indicating a time the test case of the plurality of test cases was run, an identification of a commit of code to a code repository, a detected error detected by the test case of the plurality of test cases, and/or a location of the detected error detected by the test case of the plurality of test cases.

13. The method of claim 8, further comprising:
   determining that a change has occurred in the second block of code; and
   retesting the second block of code, the retesting comprising:
   detecting that a regression in the second block of code has occurred due at least in part by the change in the second block of code, the regression indicating that at least a portion of the second block of code includes a detected error, the at least the portion of the second block of code being previously error-free,
   bisecting, based on the at least one test statistic, the retested second block of code to determine a location of the detected error,
   determining that the detected error is located within the at least the portion of the second block of code, and
   executing, based on the at least one test statistic, the test case to determine the location of the detected error.

14. A non-transitory computer-readable medium storing instructions, which when executed by at least one data processor, result in operations comprising:
   determining, by a test controller, during testing of a first block of code, at least one test statistic has not been collected;
   collecting, by the test controller, based on the determination and during the testing of the first block of code, the at least one test statistic, the at least one test statistic comprising an association between a test case from a plurality of test cases and a portion of the first block of code, the association comprising a previous detection, by the test case, of a type of error in the portion of the first block of code, the collecting comprising:
   injecting, by the test controller, one or more errors into the first block of code;
   testing, by the test controller using a full test suite including each of the plurality of test cases, the first block of code;
   detecting, by the test controller, the type of error in the portion of the first block of code, the type of error associated with the injected one or more errors; and
   associating, by the test controller, the type of error with the portion of the first block of code;
   storing, by the test controller in a database, the at least one test statistic;
   generating, by the test controller and based on detection of a commit of a second block of code, a reduced test suite to test the second block of code that includes the portion of the first block of code by at least:
   accessing, by the test controller directly from the database, the at least one test statistic;
   selecting, by the test controller and based on the accessed at least one test statistic, the test case from the plurality of test cases; and
   adding, by the test controller, the test case to the reduced test suite when the association of the accessed at least one test statistic indicates that the test case previously detected the type of error in the portion of the first block of code; and
   testing, by the test controller using the reduced test suite including the test case, the second block of code.

15. The non-transitory computer-readable medium of claim 14, wherein the operations further comprise:
   generating, by the test controller, the at least one test statistic; and
   storing the at least one generated test statistic.

16. The non-transitory computer-readable medium of claim 15, wherein the generating further comprises: determining, by the test controller, that the second block of code is to be tested upon receipt of a triggering event, the triggering event including an instruction to test a portion of the second block of code, a scheduled test case, and/or the commit of the second block of code.

17. The non-transitory computer-readable medium of claim 14, further comprising:
   determining, based on the testing the second block of code, that the second block of code includes a detected error in a portion of the second block of code;
   generating a ticket associated with the detected error, the ticket including a location of the detected error in the second block of code and user information related to a user from which a client device received the second block of code; and
   transmitting the ticket.

\* \* \* \* \*